UNITED STATES PATENT OFFICE.

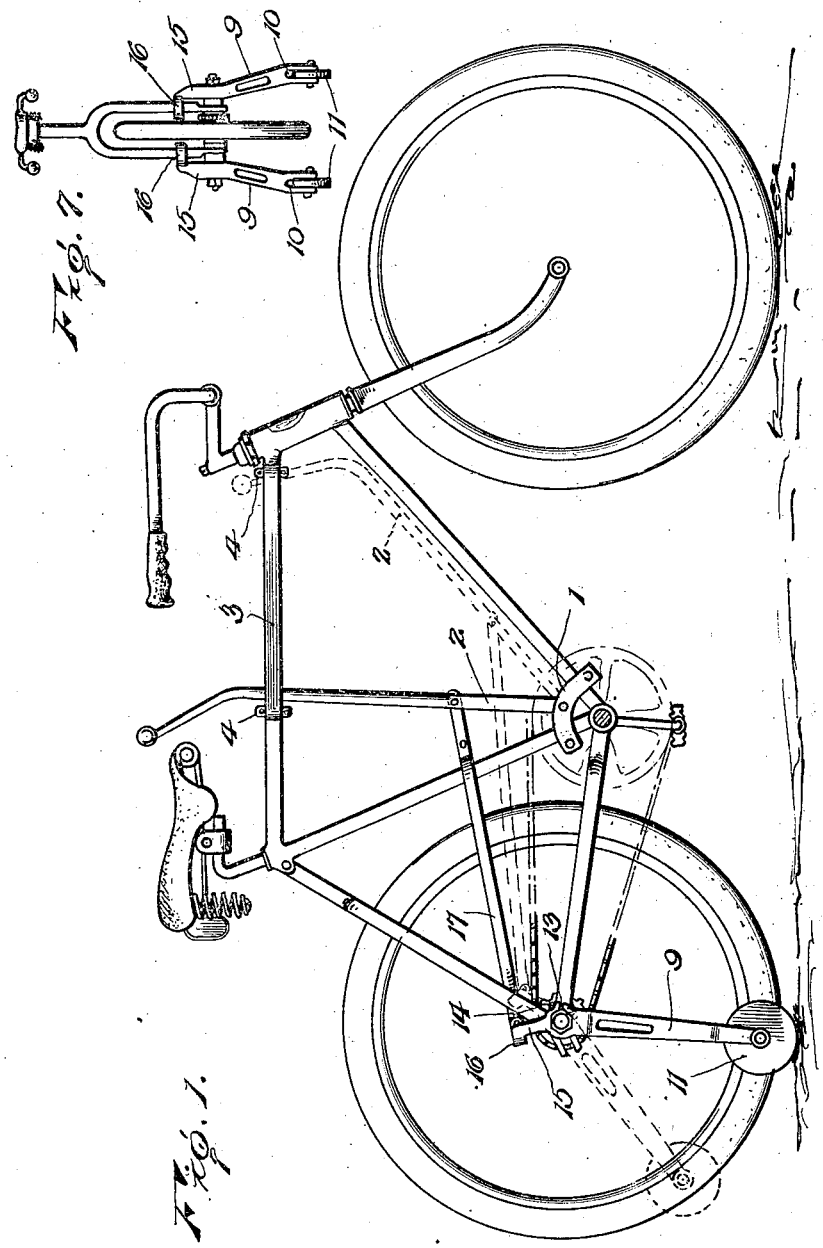

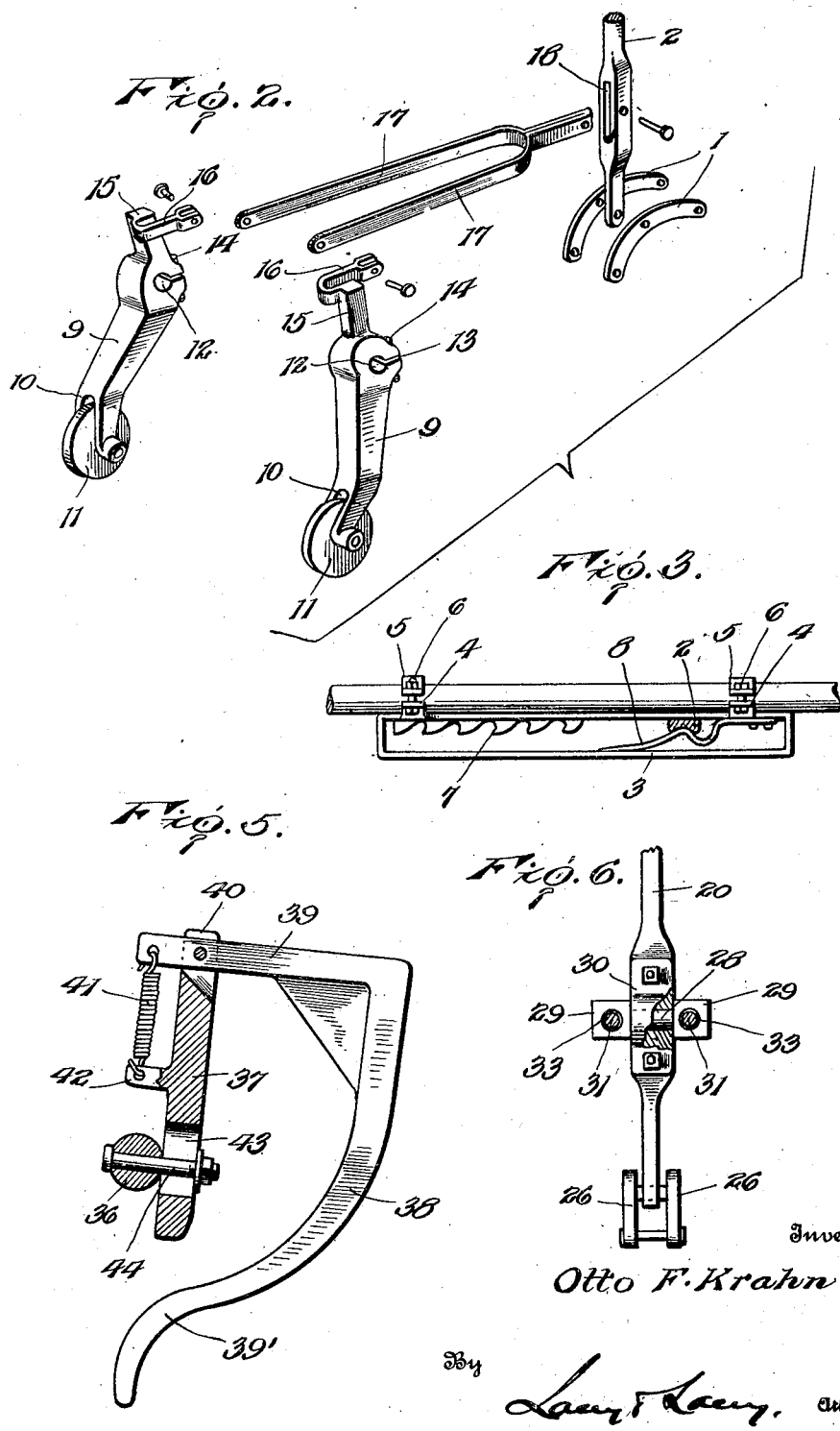

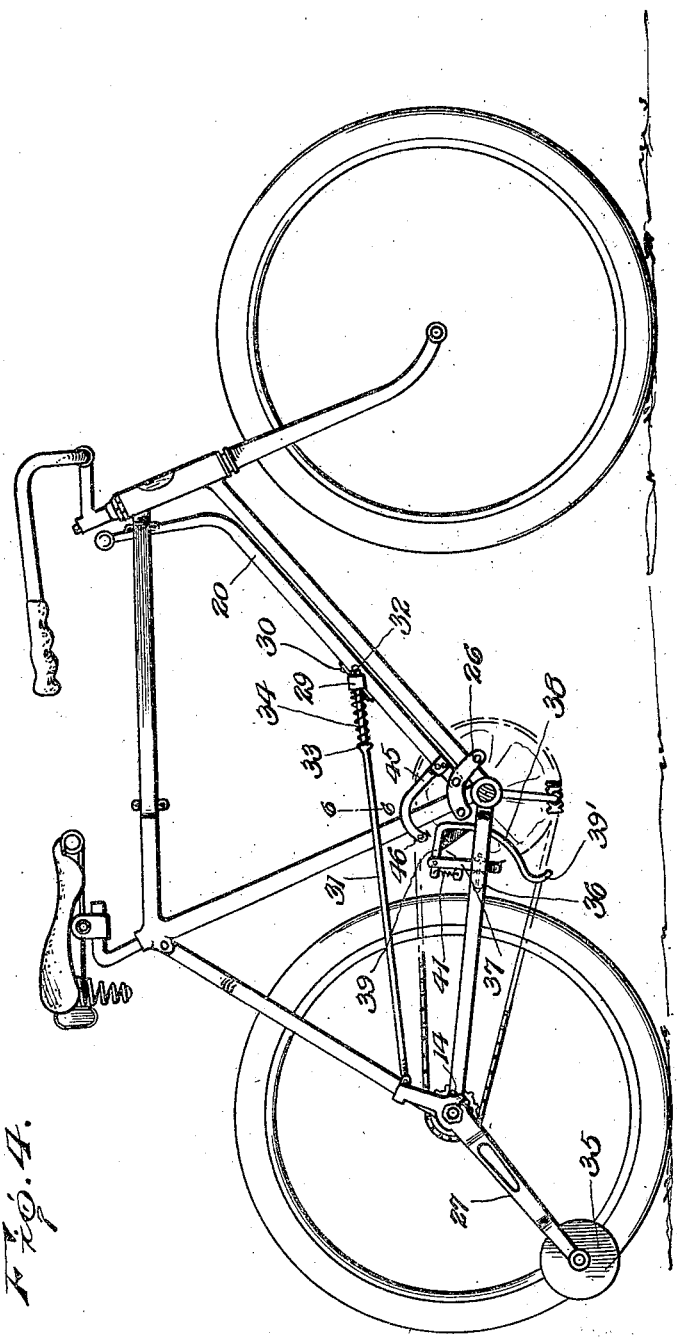

OTTO F. KRAHN, OF LOYAL, WISCONSIN.

BICYCLE-REST.

1,369,116.   Specification of Letters Patent.   Patented Feb. 22, 1921.

Application filed July 15, 1920. Serial No. 396,510.

*To all whom it may concern:*

Be it known that I, OTTO F. KRAHN, a citizen of the United States, residing at Loyal, in the county of Clark and State of Wisconsin, have invented certain new and useful Improvements in Bicycle-Rests, of which the following is a specification.

My invention has for its object the provision of simple, easily operated and efficient means whereby when a bicycle or motor cycle is not in use it may be supported in an upright position. A further object of the invention is to provide means whereby the support will be held against accidental movement from a set position and a still further object of the invention is to provide means whereby when the support or rest is shifted to its operative position a brake may be applied to the driving wheel of the cycle and the further travel of the cycle arrested.

The invention is illustrated in the accompanying drawings, in which—

Figure 1 is a side elevation of a bicycle having one form of my rest applied thereto;

Fig. 2 is a detail perspective view of the rest shown in Fig. 1 removed from the bicycle and with the parts separated but in approximately their relative positions;

Fig. 3 is a detail sectional plan view of the means for holding the rest in a set position;

Fig. 4 is a side elevation of a bicycle having another embodiment of the invention applied thereto;

Fig. 5 is an enlarged detail sectional elevation of a brake;

Fig. 6 is a detail section on the line 6—6 of Fig. 4;

Fig. 7 is a rear elevation on a reduced scale.

The bicycle may be of any approved design and in itself forms no part of my invention, being illustrated merely to show the application of the rest. In applying to the vehicle the form of invention illustrated in Figs. 1 and 2, I secure to the frame of the bicycle above and adjacent the crank hanger the clamping bars or plates 1 to and between which I pivot the lower end of a hand lever 2 which extends up above the bicycle frame and plays within a loop 3 secured thereon. The loop may be secured upon the frame in any desired manner and a convenient method is that illustrated in Fig. 3 in which the loop is formed of a suitable length of strap metal having its ends intimately joined and equipped at its upper and lower edges with perforated ears or lugs 4 which project above and below the bicycle frame and conform thereto. Similar clips or clamping plates 5 are fitted to the opposite sides of the perch of the bicycle frame and screw bolts 6 are fitted through the said plates and lugs to secure them firmly to the frame. Upon the inner face of the loop, I provide a plurality of shoulders 7 against any one of which the lever may be engaged when it is thrown backwardly so that the rest will be held to the ground and will support the cycle in an upright position. When the bicycle is in use, the lever is thrown forwardly and is engaged under a resilient latch 8 secured at the front end of the loop 3 and will be thereby held in its forward position, as shown in dotted lines in Fig. 1. In its forward position, the lever is out of the way of the rider so that it will not interfere with the steering of the bicycle and it will be readily understood that the spring latch 8 may be adjusted longitudinally of the loop 3 so that the device may be readily fitted to bicycles of various sizes. The loop 3 obviously retains the lever close to the bicycle frame and prevents lateral swaying thereof so that it will always be in a position in which it may be easily grasped by the rider. The outer side of the lever is formed with a longitudinal groove to be engaged by a bend in the latch 8, as clearly shown in Fig. 3, whereby the lever will be held in its forward position against accidental release but may be readily swung backward when the rest is to be brought into use.

Pivotally mounted upon the rear axle of the cycle or upon extensions of the same or otherwise connected therewith are the arms 9, one of which is provided at each side of the rear wheel. As shown, these arms have forked lower ends 10 in which are fitted rollers or small wheels 11 adapted to run upon the ground at opposite sides of the rear drive wheel of the cycle so that spaced supports will be provided for the bicycle and it may be supported in an upright position. Near their upper ends the arms 9 are enlarged and provided with transverse bores 12 to receive their pivotal supports and the arms are split, as indicated at 13, so that they may be readily fitted upon the pivots and receive screw bolts 14 inserted through the lips provided by the split and thereby permit the arms to be clamped about their pivots so that while they may swing readily when desired they will be prevented by their frictional engagement from freely swinging accidentally and thereby bring the bicycle to a stop prematurely. Above the pivot-engaging portions of the arms are extensions 15 which are disposed out of alinement with the main portions of the arms and extend slightly rearwardly therefrom. At the upper extremity of each extension 15 is a lateral attaching member 16 which is shaped to curve around the upper rear fork of the bicycle frame and be pivotally attached to the rear end of a connecting rod 17. The front end of the connecting rod 17 is pivotally secured in a slot 18 in the lever 2 and it will be readily seen that when the lever 12 is swung about its pivot the movement thereof will be transmitted through the connecting rod 17 to the arm 9 so that it will be moved toward or from the ground. The connecting bars 17 at the opposite sides of the bicycle may be brought together at their front ends and may be formed integral, as clearly shown in Fig. 2. The said connecting bars will pass through the upper rear fork of the bicycle frame and pass around the central post of the frame, as shown clearly in Fig. 1.

It will be readily understood that when the bicycle is not in use the lever 2 is swung rearwardly and the connecting bars 17 thereby pushed rearwardly so that the arms 9 are swung downwardly to bring the rollers 11 against the surface of the ground at opposite sides of the driving wheel of the bicycle so that the bicycle will be held against falling. The rollers or wheels 11 may, of course, be equipped with rubber tires or otherwise finished as may be preferred.

In the form of the invention shown in Figs. 4 to 7, the lever 20 plays in a retaining loop on the frame to hold the bicycle rest or support in its operative or inoperative position in the same manner as the lever 2 is held in the loop 3 in the arrangement previously described. In this form of the invention, the lever is carried by clamping bars 26 corresponding in all respects to the bars 1 in the previously described form, and the arms 27 are the same in all respects as the arms 9 previously described. Upon the lever, above its fulcrum, I secure a rocking pin 28 which is provided with enlarged angular heads 29 at both ends, the pin 28 being held to the lever by a clip plate 30 bolted upon the lever and forming a bearing for the pin between the heads. The heads 29 are perforated to permit the connecting rods 31 to pass therethrough and upon the front extremities of the said rods are nuts 32 which act as stops to prevent withdrawal of the rods from the heads. Annular shoulders or abutments 33 are formed upon the rods at the rear of the heads 29 and springs 34 are coiled around the respective rods between said heads and abutments, as shown in Fig. 4, this arrangement furnishing a yieldable connection between the lever and the rest or supporting arms so that when the rollers 35 carried by the rest come into contact with the ground there will be no severe shock applied to the lever which might tend to disconnect the parts or otherwise damage them. Within the lower rear fork 36 of the bicycle frame, I secure a bracket or post 37 at the upper end of which is pivoted a brake 38. As shown clearly in Figs. 4 and 5, this brake comprises an angle lever having its upper arm 39 extended through a notch 40 at the upper extremity of the bracket or post 37 and pivoted therein, a spring 41 connecting the rear end of the said arm with a lug 42 on the post 37 so that the free end 39' of the downwardly extending arm of the angle lever will be normally held away from the rear wheel of the bicycle. The extremity 39' of the brake is so formed as to present a convex face to the driving wheel and thereby avoid cutting or unnecessary wear upon the tire of said wheel. The post 39 is provided with a vertical slot 43 through which the securing bolt 44 passes so that the post may be adjusted according to the diameter of the driving wheel and the size of the bicycle frame. Secured rigidly to the lever 20 below the connecting rods 31 is a presser arm 45 which has its extremity bifurcated so as to pass around the main post or standard of the bicycle frame and in the extremity of said bifurcation is a cross pin or bolt 46 which is adapted to bear upon the upper side of the substantially horizontal arm 39 of the brake.

When it is desired to stop the bicycle equipped with this form of the invention, the lever 20 is swung rearwardly until the rollers are brought into contact with the ground. The travel of the bicycle will not be immediately stopped, but a slight further movement of the lever will bring the rollers to the position in full lines in Fig. 1, lifting the rear wheel off the ground. At the same time the presser arm 45 will reach the point where the pin or bolt 46 will bear upon the brake and will swing the brake about its pivot in opposition to the spring 41 so that the extremity 39' will be caused to bear upon the tire of the driving wheel and stop its rotation as will be readily understood. When the bicycle is again used, the lever 20 is swung forwardly and the spring 41 will at once release the brake as will be readily understood.

Having thus described the invention, what is claimed as new is:

1. The combination with a bicycle frame, of a lever fulcrumed upon the frame, a supporting arm pivotally mounted upon the frame concentric with the rear driving wheel of the bicycle and passing above and below its pivotal point, an extension at the upper end of said arm constructed to pass around the adjacent portion of the bicycle frame when the arm is swung pivotally, a ground-engaging member at the lower end of said arm, and a connecting bar pivoted at its rear end to the said extension and at its front end to the lever.

2. The combination with a bicycle frame, of a supporting arm having a split portion near its upper end adapted to be fitted to an extension of the bicycle rear axle, means for closing the split portion about the said extension, a tongue rising from the upper end of said arm, a laterally curved extension at the upper end of said tongue, a lever mounted on the bicycle frame, and a connecting bar pivoted at its front end to said lever and at its rear end to said lateral curved extension.

3. The combination with a bicycle frame, of a lever fulcrumed thereon, a supporting arm pivotally mounted upon the rear end of the frame, a connecting rod pivoted at its rear end to said supporting arm and at its front end having a lost-motion pivotal connection with the lever, and means on the bicycle frame to engage the lever and hold it in a set position.

4. The combination with a bicycle frame, of a lever mounted thereon, a supporting arm pivoted at the rear end of the frame, a lost-motion connection between the lever and said arm, a brake pivotally mounted upon the bicycle frame, and a presser arm carried by the lever and adapted to actuate said brake.

5. The combination with a bicycle frame, of a lever mounted thereon, a supporting arm pivoted at the rear end of the frame, a connection between the lever and said supporting arm, a post secured upon the frame, a brake pivoted upon said post, a yieldable connection between one end of said brake and the post, and a presser arm carried by the lever adapted to bear upon the brake and actuate the same in opposition to said spring.

In testimony whereof I affix my signature.

OTTO F. KRAHN. [L. S.]